(12) United States Patent
Song et al.

(10) Patent No.: US 11,436,493 B2
(45) Date of Patent: Sep. 6, 2022

(54) CHROMOSOME RECOGNITION METHOD BASED ON DEEP LEARNING

(71) Applicant: Hangzhou Diagens Biotech Co.,LTD., Hangzhou (CN)

(72) Inventors: Ning Song, Hangzhou (CN); Chaoyu Wu, Hangzhou (CN); Weiqi Ma, Hangzhou (CN)

(73) Assignee: Hangzhou Diagens Biotech Co., LTD., Hangzhou (CN)

( * ) Notice: Subject to any disclaimer, the term of this patent is extended or adjusted under 35 U.S.C. 154(b) by 0 days.

(21) Appl. No.: 17/272,254

(22) PCT Filed: Jun. 6, 2019

(86) PCT No.: PCT/CN2019/090230
§ 371 (c)(1),
(2) Date: Feb. 26, 2021

(87) PCT Pub. No.: WO2020/042704
PCT Pub. Date: Mar. 5, 2020

(65) Prior Publication Data
US 2021/0312285 A1 Oct. 7, 2021

(30) Foreign Application Priority Data
Aug. 27, 2018 (CN) .............................. 201810979111

(51) Int. Cl.
*G06N 3/08* (2006.01)
*G06N 3/12* (2006.01)
(52) U.S. Cl.
CPC ................. *G06N 3/08* (2013.01); *G06N 3/12* (2013.01)
(58) Field of Classification Search
CPC ............. G06N 3/12; G06N 7/046; G06N 3/08
See application file for complete search history.

(56) References Cited

U.S. PATENT DOCUMENTS 8,605,981 B2 * 12/2013 Rogan .................. C12Q 1/6883
382/133
10,496,924 B1 * 12/2019 Highnam ............ H04L 63/1475

FOREIGN PATENT DOCUMENTS

| CN | 104331712 A | 2/2015 |
| CN | 105957092 A | 9/2016 |

(Continued)

OTHER PUBLICATIONS

Qiu et al., "Applying deep learning technology to automatically identify metaphase chromosomes using scanning microscopic images: an initial investigation", Mar. 9, 2016, Proc. SPIE 9709, Biophotonics and Immune Responses XI, 97090K, pp. 1-7. (Year: 2016).*

(Continued)

*Primary Examiner* — Ying Yu Chen
(74) *Attorney, Agent, or Firm* — Bayramoglu Law Offices LLC

(57) ABSTRACT

A chromosome recognition method based on deep learning includes the following steps: step 1, obtaining an independent chromosome image; step 2, calculating a manual feature of a chromosome; step 3, performing basic image processing on the chromosome; step 4, building a deep learning model; and step 5, predicting a type of the chromosome based on the deep learning model. By adopting a deep learning method, the chromosome recognition method can be used for recognizing the chromosome type accurately and efficiently. Compared with an existing recognition technology, the chromosome recognition method based on deep learning of the present invention has the advantages that the chromosome karyotype analysis efficiency can be effectively improved, the recognition sequencing time can be shortened, automatic classification and sequencing of chromosomes can be completely with high accuracy.

12 Claims, 3 Drawing Sheets

(56) References Cited

FOREIGN PATENT DOCUMENTS

| CN | 107784324 A | 3/2018 |
|----|-------------|--------|
| CN | 109300111 A | 2/2019 |

OTHER PUBLICATIONS

Saranya et al., "An Effective Algorithm for Centerline Extraction and length calculation from Human Metaphase Chromosomes", 2014, 2014 International Conference on Green Computing Communication and Electrical Engineering (ICGCCEE), pp. 1-4. (Year: 2014).*

Poletti et al., "A modular framework for the automatic classification of chromosomes in Q-band images", Oct. 1, 2011, Computer Methods and Programs in Biomedicine vol. 105, Issue 2, pp. 120-130. (Year: 2011).*

Wang et al., "Automated identification of abnormal metaphase chromosome cells for the detection of chronic myeloid leukemia using microscopic images", 2010, Journal of Biomedical Optics 15(4), pp. 046026-1 to 046026-12. (Year: 2010).*

Exsilio Solutions, "Accuracy, Precision, Recall & F1 Score: Interpretation of Performance Measures", Sep. 9, 2016, https://blog.exsilio.com/all/accuracy-precision-recall-f1-score-interpretation-of-performance-measures/ pp. 1-7. (Year: 2016).*

Akosa, "Predictive Accuracy: A Misleading Performance Measure for Highly Imbalanced Data", 2017, Paper 942-2017, pp. 1-12. (Year: 2017).*

\* cited by examiner

CHROMOSOME RECOGNITION METHOD BASED ON DEEP LEARNING

CROSS REFERENCE TO THE RELATED APPLICATIONS

This application is the national phase entry of International Application No. PCT/CN2019/090230, filed on Jun. 6, 2019, which is based upon and claims priority to Chinese Patent Application No. 201810979111.X, filed on Aug. 27, 2018, the entire contents of which are incorporated herein by reference.

TECHNICAL FIELD

The present invention relates to a chromosome recognition method based on deep learning, and belongs to the technical field of chromosome recognition.

BACKGROUND

A human chromosomal disease is a syndrome with a series of clinical symptoms caused by geneogenous chromosome number or structure abnormality, mainly includes infant feeblemindedness, hypoevolutism and congenital abnormality, and may also cause miscarriage, stillborn foetus, etc. at the same time. These are unbearable for each family. However, a prevalence rate of this symptom in pregnant crowds in China is about 5% to 10%, and accounts for a half or higher in aborted fetuses. Moreover, these data have been increasing year by year, and Chinese government and related institutions have also begun to pay attention to the chromosome disease.

According to a method of clinically examining the human chromosome disease, a chromosome banding karyotype sample is obtained by culturing body cells through a series of operations, then, a photo is obtained through digital photographing, and next, a chromosome picture is analyzed and recognized. Existing chromosome picture analysis methods basically adopt manual operations and artificial recognition, so that examination doctors can master the knowledge of recognizing each chromosome type only after expending a lot of training time, and the workload is heavier. Even if chromosome analysis and recognition of a patient is performed by an experienced doctor, it will take two weeks or longer for a whole flow process generally, so that the time period is longer. Additionally, artificial recognition is strong in subjectivity, is very easy to be influenced by external environment, and is low in accuracy.

SUMMARY

By aiming at the defects in the prior art, an objective of the present invention is to provide a chromosome recognition method based on deep learning. A deep learning method is adopted for automatically, accurately and efficiently recognizing a chromosome type, the chromosome karyotype analysis efficiency is effectively improved, the recognition sequencing time is shortened, automatic classification and sequencing of chromosomes is completely with high accuracy, at the same time, the workload of doctors can be effectively reduced, and the chromosome recognition method is free of external interference, is concise and reasonable in step, can be popularized and applied externally on a large scale, and is simple in deployment.

In order to achieve the above objective, the present invention has the following technical solution:

A chromosome recognition method based on deep learning includes the following steps:
Step 1, obtaining an independent chromosome image;
Step 2, calculating a manual feature of a chromosome;
Step 3, performing basic image processing on the chromosome;
Step 4, building a deep learning model; and
Step 5, predicting a type of the chromosome based on the deep learning model.

The present invention adopts the deep learning method, and the chromosome type can be automatically, accurately and efficiently recognized. Compared with an existing recognition technology, the chromosome recognition method based on deep learning of the present invention has the advantages that the chromosome karyotype analysis efficiency can be effectively improved, the recognition sequencing time can be shortened, automatic classification and sequencing of the chromosomes can be completely with high accuracy, at the same time, the workload of doctors can be effectively reduced, and the chromosome recognition method is free of external interference, is concise and reasonable in step, can be popularized and applied externally on a large scale, and is simple in deployment.

As a preferable technical measure,
the Step 2 includes the following steps:
a) extracting a chromosome skeleton based on a morphological operation and a skeleton extraction algorithm, and calculating a length of the chromosome;
b) obtaining a relative proportion length by dividing the length of the chromosome by a length of the longest chromosome in a same cell; and
c) calculating an area proportion relative to a bounding rectangle, a proportion relative to a convex hull thereof, and eccentricity based on a single chromosome image.

These three indexes are used for evaluating morphological features of the chromosome, for example, whether the chromosome has a big area or not, whether the chromosome is convex or not, and whether the chromosome is very round or not. The above features will participate in final model building. By innovatively integrating manually extracted features in a deep network, work procedures and a flow process of the present invention are more reasonable and ordered.

As a preferable technical measure, the Step 3 includes the following steps:
a) amplifying the chromosome image along the longest axis to bs pixels; amplifying the chromosome image along the other axis in the same proportion; and enabling image sizes of different chromosomes to be inconsistent, wherein an algorithm and a framework have consistency requirements on input image sizes, so that the present invention performs unified size processing on all images, and a processing rule is to perform amplification according to a longer axis of the image;
b) filling an amplified image with white pixels 255 to a size of a square of bs*bs pixels, wherein an original background color of the chromosome image is white, so white pixels are filled, the white pixel filling conforms to features of the chromosome image, the image processing difficulty is reduced, and the chromosome recognition efficiency is improved;
c) performing rotating and overturning data augmentation operations on the image before training the deep network; and
d) performing normalization processing on all input images to make the image input possibly be consistent in standard and the network training be more easily converged.

As a preferable technical measure, the Step 4 includes the following steps:

S1, building a model structure, wherein a backbone network model is based on a ResNet structure;

S2, using a residual learning mode to greatly improve the feature extraction effectiveness of the model, build a deep layer network under the condition of avoiding an overfitting training sample set, and improve the accuracy of the model, wherein a depth of the model is hs layers;

S3, using an MLP network by a model classifier, wherein a key point of using this network is to be able to build an end-to-end network without the need of singly training an SVM classifier based on the feature, and two MLP classifiers are used by the model, and respectively aim at chromosome type recognition and polarity recognition; a neuron parameter composition of the type recognition classifier is (ms+ns)*24; a neuron parameter composition of the polarity recognition classifier is (ms+ns)*ms, ms*2; an objective of the chromosome type classifier is to output prediction probabilities of 24 types of chromosomes, and an objective of the polarity classifier is to output prediction probabilities of 2 kinds of polarities, i.e., long arm downward or long arm upward, wherein ms is from global pooling of last ms features of residual network extraction, and ns is from addition of additional manually extracted features;

S4, setting neuron parameters (ms+ns) for the MLP classifiers, wherein in existing chromosome classification literatures, length information is a very important judging basis, so that the model comprehensively considers deep learning features and manual design features, and comprehensively considers a CNN result, and a relative skeleton length, an area proportion relative to a bounding rectangle, a proportion relative to a convex hull thereof and eccentricity of the chromosome during classification; by using such a building mode, data bonuses brought by using deep learning on a large-scale data set are taken into account, the features considered by the algorithm have certain interpretability, and this is not considered by existing literatures and methods;

S5, setting a loss function of the model as a cross-entropy loss defining the following mathematical expression:

$$\text{loss}(x, t) = -\log\left(\frac{\exp(x[t])}{\sum_j^{N_{cls}} \exp(x[j])}\right),$$

wherein exp(x) is an abbreviation of exponential, i.e., is an exponential function $e^x$;

x is a result vector output by the MLP classifier, and $N_{cls}$ is a total to-be-predicted classification type number; for chromosome type classification, a dimension of x is 24 dimensions, and $N_{cls}$=24; for polarity classification, a dimension of x is 2 dimensions, and $N_{cls}$=2; j is a counting subscript for accumulating each element x[j] in the x vector;

t is a true gold standard label; for type classification, a value of t is between 0 and 23, representing a chromosome 1 to a Y chromosome; for polarity classification, a value of t is 0 and 1, representing long arm upward or long arm downward;

for a whole function, a negative logarithm of a probability value is taken, so that a minimum value can be conveniently solved; and a fraction explanation meaning in the logarithm, by taking type prediction as an example, in all type prediction results x[j], j=1, 2, . . . , 24, is a probability of a type corresponding to the gold standard label t; and S6, using an ADAM optimizer during training of the deep learning model.

As a preferable technical measure, the Step 5 includes the following steps:

a) using the deep learning model, wherein the MLP classifiers of the deep learning model respectively output 24 kinds of probability values of type classification and 2 kinds of probability values of polarity prediction; most chromosomes can be accurately predicted at a very high confidence degree, and a sum of all type prediction probabilities is 1, for example, if a prediction result shows that the probability of the chromosome picture being the first type chromosome is 0.9, the probability of the chromosome picture being the second type chromosome is 0.05, the probability of the chromosome picture being the third type chromosome is 0.05, . . . , the picture is regarded to be the first type chromosome according to a principle of the maximum probability; and b) regarding the chromosome belonging to a type a and the confidence degree being a probability p in a deep learning prediction result if the probability p of predicting the chromosome to be the type a is the maximum in all of 24 type probabilities; regarding the confidence degree being low if p is smaller than 0.7; for the chromosome with a low type confidence degree, directly performing lookup based on a relative length to predict the chromosome type, wherein the chromosome type closest to the relative value is able to be solved by a table lookup method according to the proportion of the chromosome relative to the length of the longest chromosome 1, and a relative length table in the table lookup method is obtained by calculation according to a standard chromosome map.

As a preferable technical measure, Step 6 of building an evaluation system for a chromosome recognition result is also included.

Evaluation indexes are selected as follows: accuracy, sensitivity and specificity, precision and recall, and an $F_1$ index. Supposing classification objectives are only in two types recorded as positive examples and negative examples, the evaluation indexes are respectively as follows:

1) TP: a number of examples being correctly classified as positive examples, i.e., a number of examples which are actually positive examples and are classified as positive examples by the deep learning model;

2) FP: a number of examples being falsely classified as positive examples, i.e., a number of examples which are actually negative examples but are classified as positive examples by the deep learning model;

3) FN: a number of examples being falsely classified as negative examples, i.e., a number of examples which are actually positive examples but are classified as negative examples by the deep learning model;

4) TN: a number of examples being correctly classified as negative examples, i.e., a number of examples which are actually negative examples and are classified as negative examples by the deep learning model;

$$\text{accuracy} = \frac{TP + TN}{TP + FN + TN + FP},$$

$$\text{sensitivity} = \frac{TP}{TP + FN},$$

$$\text{specificity} = \frac{TN}{TN + FP},$$

$$\text{precision} = \frac{TP}{TP+FP},$$

$$\text{recall} = \frac{TP}{TP+FN}, \text{ and}$$

$$F_1 = \frac{2TP}{2TP+FN+FP};$$

a range of these 5 evaluation indexes is between 0 and 1; and a higher score represents a better classification effect.

The sensitivity and the recall have the same definition, but the sensitivity and the specificity are used as a pair for evaluation, and the precision and the recall are used as a pair for evaluation. However, in practical formula calculation, the sensitivity and the recall have no difference. By building a reasonable index evaluation system, the recognition effect of the present invention can be timely known, and further, the present invention can be timely improved.

As a preferable technical measure, the bs is a number containing factors 32 and 64, and a value of the bs is 256. The chromosome image can be 310 pixels to a longest extent, and 256 is a number which is closest to 310 and contains the factors 32 and 64, so that selection of 256 pixels can meet an image size requirement on one hand, is favorable for enabling a final image size after neural network pooling to conform to an experience rule of deep learning on the other hand, and data processing and precision control of the present invention are facilitated.

A rotating angle is controlled between 30° and −30°, and overturning includes horizontal overturning and vertical overturning. The horizontal overturning is to expand sample diversity, and the vertical overturning is to change a polarity label. The overturning degree shall not be too great because the polarity needs to be determined. If the rotating degree is too great, a direction of a long arm will be changed, and the polarity will be changed, so that the rotating angle shall not be too great. By controlling the rotating angle between 30° and −30°, a sample diversity requirement can be just met, and at the same time, the polarity change cannot be caused.

As a preferable technical measure, normalization is performed by the following steps: for each chromosome image, firstly calculating a mean value and a standard deviation of each chromosome image, and then obtaining an image after normalization processing according to the following formula:

$$Image_{new} = \frac{Image_{old} - \mu}{\sigma},$$

wherein $\mu$ is a mean value of the image, and $\sigma$ is a standard deviation of the image; $Image_{old}$ is an original image, and $Image_{new}$ is an image after normalization processing; and through processing by the step, all images theoretically have 0 variance and 1 standard deviation. This step aims at possibly enabling the standards of the network input to be consistent and enabling the network training to more easily converge.

As a preferable technical measure, in S1, the ResNet structure is built based on a residual structure of BasicBlocks, four groups of BasicBlocks are used, quantities of BasicBlocks in each group are respectively 3, 6, 27 and 3, and an objective of the residual BasicBlocks is mainly to train a CNN through fitting residues of features of a prediction output, so that high-dimension features are continuously extracted for final classification.

As a preferable technical measure, in S6, parameters of the ADAM optimizer are respectively set as follows: β1=0.9, and β2=0.99; a learning rate of training is initially set to be 0.01 which progressively decreases along with increase of an iteration number; and the total iteration number of the training is 120, and a Batchsize (sample size of batch training) is set to be 256.

hs=80. Through experiments, it can be known that 80 layers is ideal, more layers cannot obviously improve the accuracy but can cause training insufficiency on a network with more layers due to sample insufficiency, additionally, the network with more layers occupies more GPU video memory, and is not suitable for popularization. A network with less layers will influence accuracy. If the network has too few layers, the network has a poor fitting capability on the sample prediction type and a poor adaptation capability on the sample diversity.

A value range of ms is between 256 and 4096; and ns=4. ms is preferably 256. If the neurons are more, more samples are required for training, and more computational resources are occupied. By extracting the last 256 features, i.e., 256 neurons by the ResNet, a precision requirement of the present invention can be met. Meanwhile, the processing speed is high, and few resources are occupied.

Compared with the prior art, the present invention has the following beneficial effects: The present invention adopts the deep learning method, and the chromosome type can be automatically, accurately and efficiently recognized. Compared with an existing recognition technology, the chromosome recognition method based on deep learning of the present invention has the advantages that the chromosome karyotype analysis efficiency can be effectively improved, the recognition sequencing time can be shortened, automatic classification and sequencing of the chromosomes can be completely with high accuracy, at the same time, the workload of doctors can be effectively reduced, and the chromosome recognition method is free of external interference, is concise and reasonable in step, can be popularized and applied externally on a large scale, and is simple in deployment.

DETAILED DESCRIPTION OF THE EMBODIMENTS

Figure 1:
FIG. 1 is an image filled with white pixels.

In order that the objectives, technical solutions and advantages of the present invention will become more apparent, the present invention will be described in more detail with reference to the drawings and embodiments hereafter. It should be understood that the specific embodiments described herein are only for illustrating but not for limiting the present invention.

On the contrary, the present invention is intended to cover any alternatives, modifications, equivalent methods and solutions falling within the spirit and scope of the present invention as defined by the claims. Furthermore, in order to provide a better understanding of the present invention, specific details will be described in detail in the following detailed description of the present invention. The present invention may also be fully understood by those skilled in the art without a detailed description of these details.

A chromosome recognition method based on deep learning includes the following steps:

Step 1, an independent chromosome image is obtained.

Step 2, a manual feature of a chromosome is calculated. The Step 2 includes the following steps:

a) a chromosome skeleton is extracted based on a morphological operation and a skeleton extraction algorithm, and a length of the chromosome is calculated;

b) a relative proportion length is obtained by dividing the length of the chromosome by a length of the longest chromosome in a same cell; and c) an area proportion relative to a bounding rectangle, a proportion relative to a convex hull thereof, and eccentricity are calculated based on a single chromosome image.

These three indexes are used for evaluating morphological features of the chromosome, for example, whether the chromosome has a big area or not, whether the chromosome is convex or not, and whether the chromosome is very round or not. The above features will participate in final model building. By innovatively integrating manually extracted features in a deep network, work procedures and a flow process of the present invention are more reasonable and ordered.

Figure 2:
FIG. 2 is an original image of a chromosome.
Figure 3:
FIG. 3 is an image obtained by performing normalization processing on the chromosome shown in FIG. 2.
Figure 4:
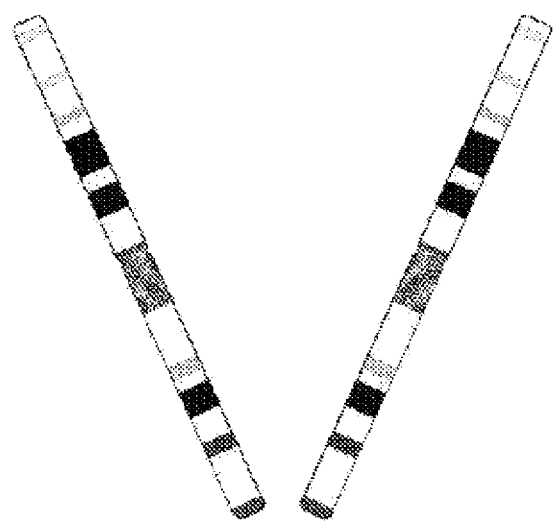
FIG. 4 is an image obtained by randomly rotating the chromosome shown in FIG. 3.
Figure 5:
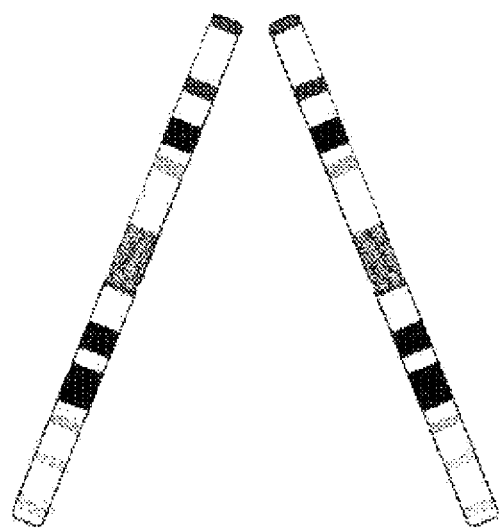
FIG. 5 is an image obtained by randomly overturning the chromosome shown in FIG. 3.

Step 3, basic image processing is performed on the chromosome. The Step 3 includes the following steps:

a) The chromosome image is amplified along the longest axis to bs pixels, and is amplified along the other axis in the same proportion; and image sizes of different chromosomes are inconsistent. However, an algorithm and a framework have consistency requirements on input image sizes, so that the present invention performs unified size processing on all images, and a processing rule is to perform amplification according to a longer axis of the image. The bs is a number containing factors 32 and 64, and a value of the bs is 256. The chromosome image can be 310 pixels to a longest extent, and 256 is a number which is closest to 310 and contains the factors 32 and 64, so that selection of 256 pixels can meet an image size requirement on one hand, is favorable for enabling a final image size after neural network pooling to conform to an experience rule of deep learning on the other hand, and data processing and precision control of the present invention are facilitated.

b) An amplified image with white pixels 255 to a size of a square of 256×256 pixels. An original background color of the chromosome image is white, so white pixels are filled, as shown in FIG. 1. The white pixel filling conforms to features of the chromosome image, the image processing difficulty is reduced, and the chromosome recognition efficiency is improved.

c) Rotating and overturning data augmentation operations are performed on the image before training the deep network. A rotating angle is controlled between 30° and −30°, and overturning includes horizontal overturning and vertical overturning. The horizontal overturning is to expand sample diversity, as shown in FIG. 4, and the vertical overturning is to change a polarity label, as shown in FIG. 5. The overturning degree shall not be too great because the polarity needs to be determined. If the rotating degree is too great, a direction of a long arm will be changed, and the polarity will be changed, so that the rotating angle shall not be too great. By controlling the rotating angle between 30° and −30°, a sample diversity requirement can be just met, and at the same time, the polarity change cannot be caused.

d) Normalization processing is performed on all input images to make the image input possibly be consistent in standard and the network training be more easily converged. Normalization is performed by the following steps: for each chromosome image, firstly, a mean value and a standard deviation of each chromosome image are calculated, and then, an image after normalization processing is obtained according to the following formula:

$$Image_{new} = \frac{Image_{old} - \mu}{\sigma},$$

wherein $\mu$ is a mean value of the image, and $\sigma$ is a standard deviation of the image; $Image_{old}$ is an original image, and $Image_{new}$ is an image after normalization processing; and through processing by the step, all images theoretically have 0 variance and 1 standard deviation, as shown in FIG. 2 to FIG. 3. This step aims at possibly enabling the standards of the network input to be consistent and enabling the network training to more easily converge.

Step 4, a deep learning model is built. The Step 4 includes the following steps:

S1, a model structure is built: a backbone network model is based on a ResNet structure. In 51, the ResNet structure is built based on a residual structure of BasicBlocks, four groups of BasicBlocks are used, quantities of BasicBlocks in each group are respectively 3, 6, 27 and 3, and an objective of the residual BasicBlocks is mainly to train a CNN through fitting residues of features of a prediction output, so that high-dimension features are continuously extracted for final classification.

S2, the feature extraction effectiveness of the model can be greatly improved by using a residual learning mode, additionally, a deep layer network can be built under the condition of avoiding an overfitting training sample set, and the accuracy of the model is improved. A depth of the model is 80 layers. Through experiments, it can be known that 80 layers is ideal, more layers cannot obviously improve the accuracy but can cause training insufficiency on a network with more layers due to sample insufficiency, additionally, the network with more layers occupies more GPU video memory, and is not suitable for popularization. A network with less layers will influence accuracy. If the network has too few layers, the network has a poor fitting capability on the sample prediction type and a poor adaptation capability on the sample diversity.

S3, an MLP network is used by a model classifier. A key point of using this network is to be able to build an end-to-end network without the need of singly training an SVM classifier based on the feature, and two MLP classifiers are used by the model, and respectively aim at chromosome type recognition and polarity recognition; a neuron parameter composition of the type recognition classifier is (ms+ns)*24; a neuron parameter composition of the polarity recognition classifier is (ms+ns)*ms, ms*2; an objective of the chromosome type classifier is to output prediction probabilities of 24 types of chromosomes, and an objective of the polarity classifier is to output prediction probabilities of 2 kinds of polarities, i.e., long arm downward or long arm upward, wherein ms is from global pooling of last ms features of residual network extraction, and ns is from addition of additional manually extracted features.

ms=256. ns=4. If the neurons are more, more samples are required for training, and more computational resources are occupied. By extracting the last 256 features, i.e., 256 neurons by the ResNet, a precision requirement of the present invention can be met. Meanwhile, the processing speed is high, and few resources are occupied.

S4, neuron parameters (ms+ns) are set for the MLP classifiers. In existing chromosome classification literatures, length information is a very important judging basis, so that the model comprehensively considers deep learning features and manual design features, and comprehensively considers a CNN result, and a relative skeleton length, an area proportion relative to a bounding rectangle, a proportion relative to a convex hull thereof and eccentricity of the chromosome during classification. By using such a building mode, data bonuses brought by using deep learning on a large-scale data set are taken into account, the features considered by the algorithm have certain interpretability, and this is not considered by existing literatures and methods.

S5, a loss function of the model is set into a cross-entropy loss defining the following mathematical expression:

$$\text{loss}(x, t) = -\log\left(\frac{\exp(x[t])}{\sum_j^{N_{cls}} \exp(x[j])}\right),$$

wherein exp(x) is an abbreviation of exponential, i.e., is an exponential function $e^x$, x is a result vector output by the MLP classifier, and $N_{cls}$ is a total to-be-predicted classification type number; for chromosome type classification, a dimension of x is 24 dimensions, and $N_{cls}=24$; for polarity classification, a dimension of x is 2 dimensions, and $N_{cls}=2$; j is a counting subscript for accumulating each element x[j] in the x vector;

t is a true gold standard label; for type classification, a value of t is between 0 and 23, representing a chromosome 1 to a Y chromosome; and for polarity classification, a value of t is 0 and 1, representing long arm upward or long arm downward.

For a whole function, a negative logarithm of a probability value is taken, so that a minimum value can be conveniently solved. A fraction explanation meaning in the logarithm, by taking type prediction as an example, in all type prediction results x[j], j=1, 2, . . . , 24, is a probability of a type corresponding to the gold standard label t.

S6, an ADAM optimizer is used during training of the deep learning model. Parameters of the ADAM optimizer are respectively set as follows: β1=0.9, and β2=0.99. A learning rate of training is initially set to be 0.01 which progressively decreases along with increase of an iteration number. The total iteration number of the training is 120, and a Batchsize (sample size of batch training) is set to be 256.

Step 5, a type of the chromosome is predicted based on the deep learning model. The Step 5 includes the following steps:

a) The deep learning model is used. The MLP classifiers of the deep learning model respectively output 24 kinds of probability values of type classification and 2 kinds of probability values of polarity prediction; most chromosomes can be accurately predicted at a very high confidence degree, and a sum of all type prediction probabilities is 1. For example, if a prediction result shows that the probability of the chromosome picture being the first type chromosome is 0.9, the probability of the chromosome picture being the second type chromosome is 0.05, the probability of the chromosome picture being the third type chromosome is 0.05, . . . , the picture is regarded to be the first type chromosome according to a principle of the maximum probability.

b) The chromosome is regarded belonging to a type a and the confidence degree is regarded being a probability p in a deep learning prediction result if the probability p of predicting the chromosome to be the type a is the maximum in all of 24 type probabilities. The confidence degree is regarded being low if p is smaller than 0.7. For the chromosome with a low type confidence degree, lookup is directly performed based on a relative length to predict the chromosome type. The chromosome type closest to the relative value is able to be solved by a table lookup method according to the proportion of the chromosome relative to the length of the longest chromosome 1, and a relative length table in the table lookup method is obtained by calculation according to a standard chromosome map. The prediction based on the length can be understood as a correction prediction method. A relative proportion is as shown in the table below:

| Chromosome type | 1 | 2 | 3 | 4 | 5 | 6 | 7 | 8 |
|---|---|---|---|---|---|---|---|---|
| Relative length proportion | 1 | 0.9304 | 0.7784 | 0.7287 | 0.6875 | 0.679 | 0.6179 | 0.5568 |
| Chromosome type | 9 | 10 | 11 | 12 | 13 | 14 | 15 | 16 |
| Relative length proportion | 0.5369 | 0.5284 | 0.5284 | 0.10248 | 0.4347 | 0.4176 | 0.3935 | 0.3693 |
| Chromosome type | 17 | 18 | 19 | 20 | 21 | 22 | 23 | 24 |
| Relative length proportion | 0.3565 | 0.3239 | 0.2912 | 0.2813 | 0.2131 | 0.2344 | 0.6392 | 0.2188 |

Step 6, an evaluation system is built for a chromosome recognition result.

Evaluation indexes are selected as follows: accuracy, sensitivity and specificity, precision and recall, and an $F_1$ index. Supposing classification objectives are only in two types recorded as positive examples and negative examples, the evaluation indexes are respectively as follows:

1) TP: a number of examples being correctly classified as positive examples, i.e., a number of examples which are actually positive examples and are classified as positive examples by the deep learning model;

2) FP: a number of examples being falsely classified as positive examples, i.e., a number of examples which are actually negative examples but are classified as positive examples by the deep learning model;

3) FN: a number of examples being falsely classified as negative examples, i.e., a number of examples which are actually positive examples but are classified as negative examples by the deep learning model; and 4) TN: a number of examples being correctly classified as negative examples, i.e., a number of examples which are actually negative examples and are classified as negative examples by the deep learning model.

$$\text{accuracy} = \frac{TP+TN}{TP+FN+TN+FP},$$

$$\text{sensitivity} = \frac{TP}{TP+FN},$$

$$\text{specificity} = \frac{TN}{TN+FP},$$

$$\text{precision} = \frac{TP}{TP+FP},$$

$$\text{recall} = \frac{TP}{TP+FN}, \text{ and}$$

$$F_1 = \frac{2TP}{2TP+FN+FP}.$$

A range of these 5 evaluation indexes is between 0 and 1. A higher score represents a better classification effect.

The sensitivity and the recall have the same definition, but the sensitivity and the specificity are used as a pair for evaluation, and the precision and the recall are used as a pair for evaluation. However, in practical formula calculation, the sensitivity and the recall have no difference. By building a reasonable index evaluation system, the recognition effect of the present invention can be timely known, and further, the present invention can be timely improved.

In order to validate the recognition effect of the present invention, the present invention automatically sorts, collects and marks 80254 meta-phase chromosome images including 77878 normal samples and 2376 abnormal samples. The present invention performs development based on the data set. The type and the polarity can be recognized on both normal samples and abnormal samples. Good generality is realized. An accuracy test result is based on a test sample set. A validation method adopts 10-fold cross-validation. According to a cross-validation result, the present invention can reach the following performance on the test sample set:

i. type prediction:
accuracy 0.9803, sensitivity 0.9766, specificity 0.9991, precision 0.9796, recall 0.9766, F1 score 0.9779 ii. polarity prediction:
accuracy 0.9897, sensitivity 0.9895, specificity 0.9895, precision 0.9895, recall 0.9895, F1 score 0.9895

From the above experiment, it can be known that the present invention adopts the deep learning method, and the chromosome type can be automatically, accurately and efficiently recognized. Compared with an existing recognition technology, the chromosome recognition method based on deep learning of the present invention has the advantages that the chromosome karyotype analysis efficiency can be effectively improved, the recognition sequencing time can be shortened, automatic classification and sequencing of the chromosomes can be completely with high accuracy, at the same time, the workload of doctors can be effectively reduced, and the chromosome recognition method is free of external interference, is concise and reasonable in step, can be popularized and applied externally on a large scale, and is simple in deployment.

The foregoing is only preferred exemplary embodiments of the present invention and is not intended to be limiting of the present invention, and any modifications, equivalent substitutions, improvements and the like within the spirit and principles of the present invention are intended to be embraced by the protection range of the present invention.

What is claimed is:

1. A chromosome recognition method based on deep learning, comprising the following steps:
step 1, obtaining an independent image of a chromosome;
step 2, calculating a feature of the chromosome;
step 3, performing a basic image processing on the chromosome;
step 4, building and training a deep learning model; and
step 5, predicting a type of the chromosome based on the deep learning model;
wherein
the step 4 of building and training the deep learning model comprises the following steps:
S1, building a model structure for the deep learning model, wherein the model structure for the deep learning model is a backbone network model based on a residual network (ResNet) structure;
S2, using a residual learning mode to improve feature extraction effectiveness of the deep learning model, build a deep layer network of the deep learning model under a condition of avoiding an overfitting training sample set, and improve an accuracy of the deep learning model, wherein a depth of the deep learning model is hs layers, and hs=80;
S3, using a multilayer perceptron (MLP) network by a model classifier, wherein two MLP classifiers are part of the deep learning model, and the two MLP classifiers respectively aim at a chromosome type recognition and a polarity recognition; wherein a neuron parameter composition of a type recognition classifier is (ms+ns)*24; wherein a neuron parameter composition of a polarity recognition classifier is (ms+ns)*ms; wherein the chromosome type classifier outputs prediction probabilities of 24 types of chromosomes and the polarity classifier outputs prediction probabilities of two kinds of polarities, wherein the two kinds of polarities are long arm downward or long arm upward, wherein ms is from a global pooling of last ms features of a residual network extraction, and ns is from an addition of additional extracted features, wherein a value of ms is from 256 to 4096; and ns=4;
S4, setting neuron parameters (ms+ns) for the two MLP classifiers;
S5, setting a loss function of the deep learning model as a cross-entropy loss in accordance with:

$$\text{loss}(x, t) = -\log\left(\frac{\exp(x[t])}{\sum_{j}^{N_{cls}} \exp(x[j])}\right),$$

wherein exp(x) is an exponential function $e^x$;
x is a result vector output by the two MLP classifiers, and $N_{cls}$ is a total to-be-predicted classification type number; for a type classification, a dimension of x is 24 dimensions, and $N_{cls}$=24; for a polarity classification, a dimension of x is 2 dimensions, and $N_{cls}$=2; j is a counting subscript for accumulating each element x[j] in the x result vector;
t is a true gold standard label; for the type classification, a value of t is between 0 and 23; for the polarity classification, a value of t is 0 or 1, representing long arm upward or long arm downward;
for a whole function, a negative logarithm of a probability value is taken, so that a minimum value is solved; and a fraction explanation meaning in the negative logarithm in all type prediction results is a probability of a type corresponding to the true gold standard label t; and S6, training the deep learning model based on the training sample set of input images of chromosomes and the loss function, and by using an optimizer.

2. The chromosome recognition method based on the deep learning according to claim 1, wherein
the step 2 comprises the following steps:
a) extracting a skeleton of the chromosome based on a morphological operation and a skeleton extraction algorithm, and calculating a length of the chromosome;
b) obtaining a relative proportion length by dividing the length of the chromosome by a length of a longest chromosome in a same cell; and
c) calculating an area proportion relative to a bounding rectangle, a proportion relative to a convex hull of the independent image of the chromosome, and an eccentricity based on the independent image of the chromosome.

3. The chromosome recognition method based on the deep learning according to claim 2, further comprising step 6 of building an evaluation system for a chromosome recognition result, wherein
evaluation indexes are selected as follows: accuracy, sensitivity and specificity, precision, and recall, and an $F_1$ index; supposing classification objectives are only in two types recorded as positive examples and negative examples, the evaluation indexes are respectively as follows:
1) TP: a number of first examples being correctly classified as positive examples, wherein the first examples are actually the positive examples and are classified as the positive examples by the deep learning model;
2) FP: a number of second examples being falsely classified as the positive examples, wherein the second examples are actually negative examples but are classified as the positive examples by the deep learning model;
3) FN: a number of third examples being falsely classified as negative examples, wherein the third examples are actually the positive examples but are classified as the negative examples by the deep learning model;
4) TN: a number of fourth examples being correctly classified as the negative examples, wherein the fourth examples are actually the negative examples and are classified as the negative examples by the deep learning model;

$$\text{the accuracy} = \frac{TP+TN}{TP+FN+TN+FP},$$
$$\text{the sensitivity} = \frac{TP}{TP+FN},$$
$$\text{the specificity} = \frac{TN}{TN+FP},$$
$$\text{the precision} = \frac{TP}{TP+FP},$$
$$\text{the recall} = \frac{TP}{TP+FN}, \text{ and}$$
$$F_1 = \frac{2TP}{2TP+FN+FP};$$

a range of each of the evaluation indexes is between 0 and 1; and a higher score represents a better classification effect.

4. The chromosome recognition method based on the deep learning according to claim 1, wherein
the step 3 comprises the following steps:
a) amplifying the independent image of the chromosome along a longest axis to bs pixels, and amplifying the independent image of the chromosome along an other axis in a same proportion as the amplifying along the longest axis to obtain an amplified image, wherein bs is a number containing factors 32 and 64;
b) filling the amplified image with white pixels;
c) performing rotating and overturning data augmentation operations on the amplified image before training a deep network; and
d) performing a normalization processing on all input images to enable a network training to be converged.

5. The chromosome recognition method based on the deep learning according to claim 4, wherein
a value of the bs is 256;
a rotating angle of the rotating is controlled between 30° and −30°, and the overturning comprises a horizontal overturning and a vertical overturning; and the horizontal overturning is to expand a sample diversity, and the vertical overturning is to change a polarity label.

6. The chromosome recognition method based on the deep learning according to claim 5, wherein
the normalization processing is performed by the following steps: for each chromosome image of the input images, firstly calculating a mean value and a standard deviation of the each chromosome image, and then obtaining an image after the normalization processing according to the following formula:

$$Image_{new} = \frac{Image_{old} - \mu}{\sigma},$$

wherein $\mu$ is a mean value of the each chromosome image, and $\sigma$ is a standard deviation of the each chromosome image; $Image_{old}$ is an original image, and $Image_{new}$ is an image after the normalization processing; and through the normalization processing, all the input images have 0 variance and 1 standard deviation.

7. The chromosome recognition method based on the deep learning according to claim 4, further comprising step 6 of building an evaluation system for a chromosome recognition result, wherein
evaluation indexes are selected as follows: accuracy, sensitivity and specificity, precision, and recall, and an $F_1$ index; supposing classification objectives are only in two types recorded as positive examples and negative examples, the evaluation indexes are respectively as follows:
1) TP: a number of first examples being correctly classified as positive examples, wherein the first examples are actually the positive examples and are classified as the positive examples by the deep learning model;
2) FP: a number of second examples being falsely classified as the positive examples, wherein the second examples are actually negative examples but are classified as the positive examples by the deep learning model;
3) FN: a number of third examples being falsely classified as negative examples, wherein the third examples are actually the positive examples but are classified as the negative examples by the deep learning model;
4) TN: a number of fourth examples being correctly classified as the negative examples, wherein the fourth examples are actually the negative examples and are classified as the negative examples by the deep learning model;

$$\text{the accuracy} = \frac{TP+TN}{TP+FN+TN+FP},$$
$$\text{the sensitivity} = \frac{TP}{TP+FN},$$
$$\text{the specificity} = \frac{TN}{TN+FP},$$
$$\text{the precision} = \frac{TP}{TP+FP},$$
$$\text{the recall} = \frac{TP}{TP+FN}, \text{ and}$$
$$F_1 = \frac{2TP}{2TP+FN+FP};$$

a range of each of the evaluation indexes is between 0 and 1; and a higher score represents a better classification effect.

8. The chromosome recognition method based on the deep learning according to claim 1, wherein
the step 5 comprises the following steps:
a) using the deep learning model, wherein the two MLP classifiers of the deep learning model respectively output 24 kinds of probability values of a type classification and 2 kinds of probability values of a polarity prediction; and chromosomes are predicted in accordance with a confidence degree;
b) directly performing a table lookup method based on a relative length to predict a chromosome type, wherein the table lookup method comprises solving the chromosome type closest to the relative length by looking up a relative length table according to a proportion of a length of the chromosome relative to a length of a longest chromosome, and the relative length table is obtained by a calculation according to a predetermined chromosome map.

9. The chromosome recognition method based on the deep learning according to claim 8, further comprising step 6 of building an evaluation system for a chromosome recognition result, wherein
evaluation indexes are selected as follows: accuracy, sensitivity and specificity, precision, and recall, and an $F_1$ index; supposing classification objectives are only in two types recorded as positive examples and negative examples, the evaluation indexes are respectively as follows:
1) TP: a number of first examples being correctly classified as positive examples, wherein the first examples are actually the positive examples and are classified as the positive examples by the deep learning model;
2) FP: a number of second examples being falsely classified as the positive examples, wherein the second examples are actually negative examples but are classified as the positive examples by the deep learning model;
3) FN: a number of third examples being falsely classified as negative examples, wherein the third examples are actually the positive examples but are classified as the negative examples by the deep learning model;
4) TN: a number of fourth examples being correctly classified as the negative examples, wherein the fourth examples are actually the negative examples and are classified as the negative examples by the deep learning model;

$$\text{the accuracy} = \frac{TP+TN}{TP+FN+TN+FP},$$
$$\text{the sensitivity} = \frac{TP}{TP+FN},$$
$$\text{the specificity} = \frac{TN}{TN+FP},$$
$$\text{the precision} = \frac{TP}{TP+FP},$$
$$\text{the recall} = \frac{TP}{TP+FN}, \text{ and}$$
$$F_1 = \frac{2TP}{2TP+FN+FP};$$

a range of each of the evaluation indexes is between 0 and 1; and a higher score represents a better classification effect.

10. The chromosome recognition method based on the deep learning according to claim 1, further comprising step 6 of building an evaluation system for a chromosome recognition result, wherein
evaluation indexes are selected as follows: accuracy, sensitivity and specificity, precision, and recall, and an $F_1$ index; supposing classification objectives are only in two types recorded as positive examples and negative examples, the evaluation indexes are respectively as follows:
1) TP: a number of first examples being correctly classified as positive examples, wherein the first examples are actually the positive examples and are classified as the positive examples by the deep learning model;
2) FP: a number of second examples being falsely classified as the positive examples, wherein the second examples are actually negative examples but are classified as the positive examples by the deep learning model;
3) FN: a number of third examples being falsely classified as negative examples, wherein the third examples are actually the positive examples but are classified as the negative examples by the deep learning model;
4) TN: a number of fourth examples being correctly classified as the negative examples, wherein the fourth examples are actually the negative examples and are classified as the negative examples by the deep learning model;

$$\text{the accuracy} = \frac{TP+TN}{TP+FN+TN+FP},$$
$$\text{the sensitivity} = \frac{TP}{TP+FN},$$
$$\text{the specificity} = \frac{TN}{TN+FP},$$
$$\text{the precision} = \frac{TP}{TP+FP},$$
$$\text{the recall} = \frac{TP}{TP+FN}, \text{ and}$$
$$F_1 = \frac{2TP}{2TP+FN+FP};$$

a range of each of the evaluation indexes is between 0 and 1; and a higher score represents a better classification effect.

11. The chromosome recognition method based on the deep learning according to claim 1, wherein in S1, the ResNet structure is built based on a residual structure to train a convolutional neural network (CNN) through fitting residues of features of a prediction output, so that dimensional features are continuously extracted for a final classification.

12. The chromosome recognition method based on the deep learning according to claim 11, wherein in S6, parameters of the optimizer are respectively set as follows: a learning rate of the training is initially set to be 0.01, and the learning rate progressively decreases along with an increase of an iteration number; a total iteration number of the training is 120, and a Batchsize (sample size of batch training) is set to be 256; hs=80.

* * * * *